April 16, 1957 B. E. ARNESON 2,789,156

CATHODE RAY TUBE APPARATUS

Filed Sept. 7, 1954 4 Sheets-Sheet 1

INVENTOR

BLAYNE E. ARNESON

BY Ben. J. Chromy his ATTORNEY

April 16, 1957 B. E. ARNESON 2,789,156

CATHODE RAY TUBE APPARATUS

Filed Sept. 7, 1954 4 Sheets-Sheet 2

INVENTOR
BLAYNE E. ARNESON

BY Ben. J. Chromy
his ATTORNEY

INVENTOR
BLAYNE E. ARNESON

BY Ben. J. Merony
his ATTORNEY

April 16, 1957 B. E. ARNESON 2,789,156

CATHODE RAY TUBE APPARATUS

Filed Sept. 7, 1954 4 Sheets-Sheet 4

INVENTOR

BLAYNE E. ARNESON

BY Ben J. Chromy
his ATTORNEY

United States Patent Office
2,789,156
Patented Apr. 16, 1957

2,789,156

CATHODE RAY TUBE APPARATUS

Blayne E. Arneson, West Allis, Wis.

Application September 7, 1954, Serial No. 454,413
10 Claims. (Cl. 178—5.4)

This invention relates to a system for the reproduction of color television signals.

An object of this invention is to provide a system for the reproduction of color television signals which may also be used to reproduce black and white television signals.

Another object of this invention is to provide an improved cathode ray tube color television viewing device that may also be employed for viewing black and white television pictures.

Still another object of this invention is to provide a system for the reproduction of color television signals, said system employing a cathode ray tube circuit arrangement of simplified construction which may be employed for reproducing television pictures either in black and white or in color.

Another object of this invention is to provide an improved color television reproducing device employing a cathode ray tube of the same dimensions now employed in black and white television reproduction, thus making it possible to convert present black and white television receivers to color television reception by replacing the cathode ray tube of the receiver with the improved color television viewing tube and simplified control circuit of this invention.

Still another object of this invention is to provide an improved cathode ray tube for the reproduction of color television, said tube being of no greater precision than is required for the reproduction of black and white television.

A further object of this invention is to provide an improved cathode ray tube for the reproduction of color television, said tube being of a construction whereby a large percentage of the energy of the electron beam is available for the production of useful light output.

Still another object of this invention is to provide a color television reproducing system in which the definition of the reproduced picture is comparable to that obtained with the present black and white television.

Still another object of this invention is to provide a system for the reproduction of color television employing a cathode ray tube of improved design wherein the precision of the sweep circuits need be no better than in the present average, well designed black and white television receiver.

Other and further objects of this invention will be apparent to those skilled in the art to which it relates from the following specification, claims and drawing.

In accordance with this invention there is provided an improved system for the reproduction of color television signals which may also be used for the reproduction of black and white television signals. The system of this invention employs a cathode ray tube that is provided with a screen consisting of a plurality of phosphor strips adapted to fluoresce in red, green and blue colors when bombarded by the cathode ray beam. These phosphor strips are arranged in groups across the face of the tube and each group contains strips adapted to fluoresce in three colors, red, green and blue. The width of the phosphor strips may be made inversely proportional to the efficiency of the phosphor materials to provide uniform light output from each.

The tube screen is divided into strips by means of fine wires or conductive lines, the ends of which are connected together to form a target grid electrode. This grid electrode is arranged so that a group of phosphor strips responding in red, green and blue color fluorescene are positioned between adjacent wires of the grid. Thus the grid electrode also functions to divide the screen phosphor strips into groups, each group consisting of strips adapted to fluoresce red, green and blue.

The grid of the tube viewing screen is connected to the second anode terminal of the cathode ray tube through the primary winding of a suitable transformer and therefore a positive potential is applied to this grid electrode. As the electron beam of the tube scans the screen of the tube, including the aforesaid grid electrode, pulses of current will flow in the circuit thereof, one pulse occurring each time the electron beam crosses one of the grid electrode conductors. These current pulses produce voltage pulses in the output of said transformer and these voltage pulses are amplified and controlled by a suitable amplifier and limiter circuit.

The output of this amplifier is provided with a phase splitting circuit to provide a balanced three phase output voltage having a frequency that is determined by the number of wires in the grid of the screen of the tube and the rate at which the beam of the tube is scanned over this grid. These three phase voltages are employed as keying signals for the color signals. Thus the voltage of phase A is employed for keying the red video signal, voltage of phase B is employed for keying the green viedo signal and the voltage of phase C is employed for keying the blue video signal. At this point it should be emphasized that the sequence of the three phase voltages, phases A, B and C is the same as the sequence of the phosphor strips fluorescing in the colors red, green and blue forming each group of phosphor in the cathode ray tube screen. Thus by providing a three phase voltage from the pulses generated as the cathode ray tube beam contacts the grid of the screen of the tube, it is possible to produce keying signals for keying the color video signals so that the proper phosphor strips are bombarded by the cathode ray tube beam so as to reproduce the television picture in proper color values.

Further details of this invention are set forth in the following specification, claims and drawing in which, briefly:

Figure 10:
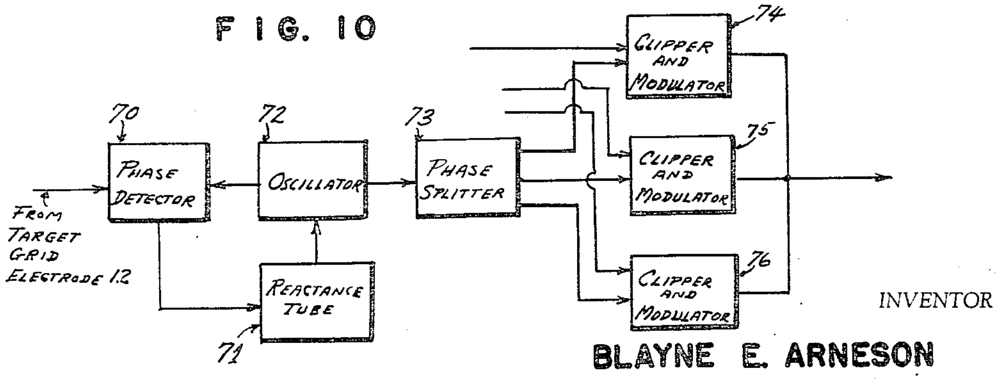

signal amplitude to the amplitude of the video signal and is used for the purpose of facilitating the explanation of this invention; and Fig. 10 is a block diagram illustrating a modified form of this invention.

The system employed in accordance with this invention, which will now be described in detail, may be used to reproduce either black and white or colored television. The cathode ray tube 10 is provided with a fluorescent screen 11 and the target grid structure 12 for this purpose and these will be described in detail hereinafter. The cathode ray tube 10 is also provided with a cathode 13, grid 14, focussing and accelerating electrode 15, second anode 16 and a standard set of deflection coils 17 that are connected to the deflection circuits 18.

The grid electrode structure 12 and the second anode terminal 19 of the cathode ray tube 10 are connected to the primary of the transformer 20. Capacitors 21 and 22 are connected across the primary and secondary windings respectively of this transformer 20 and function to tune this transformer to the radio frequency keying pulses produced by the scanning of the beam of tube 10 across the grid electrode 12. One terminal of the secondary of the transformer 20 is connected to ground, which may consist of the metal chassis of the apparatus and the other terminal of this secondary is coupled to the control grid of the amplifier tube 23 through the capacitor 24. A grid resistor 25 is connected between this control grid and ground.

The cathode of the amplifier tube 23 is also connected to ground. The anode of the tube 23 is connected to one terminal of the primary winding of the transformer 24 and the other terminal of this primary winding is connected to the positive terminal of the source of anode voltage which may be any conventional source of supply such as commonly employed to energize the anode circuits of amplifiers and is not illustrated. The negative terminal of this source of anode voltage is of course connected in conventional manner to the cathode of the amplifier tube 23.

The screen grid electrode of the tube 23 is connected to the positive terminal of the anode current supply through the resistor 25 and a capacitor 26 is provided between this screen grid electrode and ground. Capacitors 27 and 28 are connected across the primary and secondary windings respectively, of the transformer 24 for tuning this transformer and one terminal of the secondary is coupled to the control grid of the amplifier tube 29 through the capacitor 30. The other terminal of this secondary is grounded. A grid resistor 31 is also connected between the control grid of the tube 29 and ground.

Figures 2, 3, 4, 5, 8:
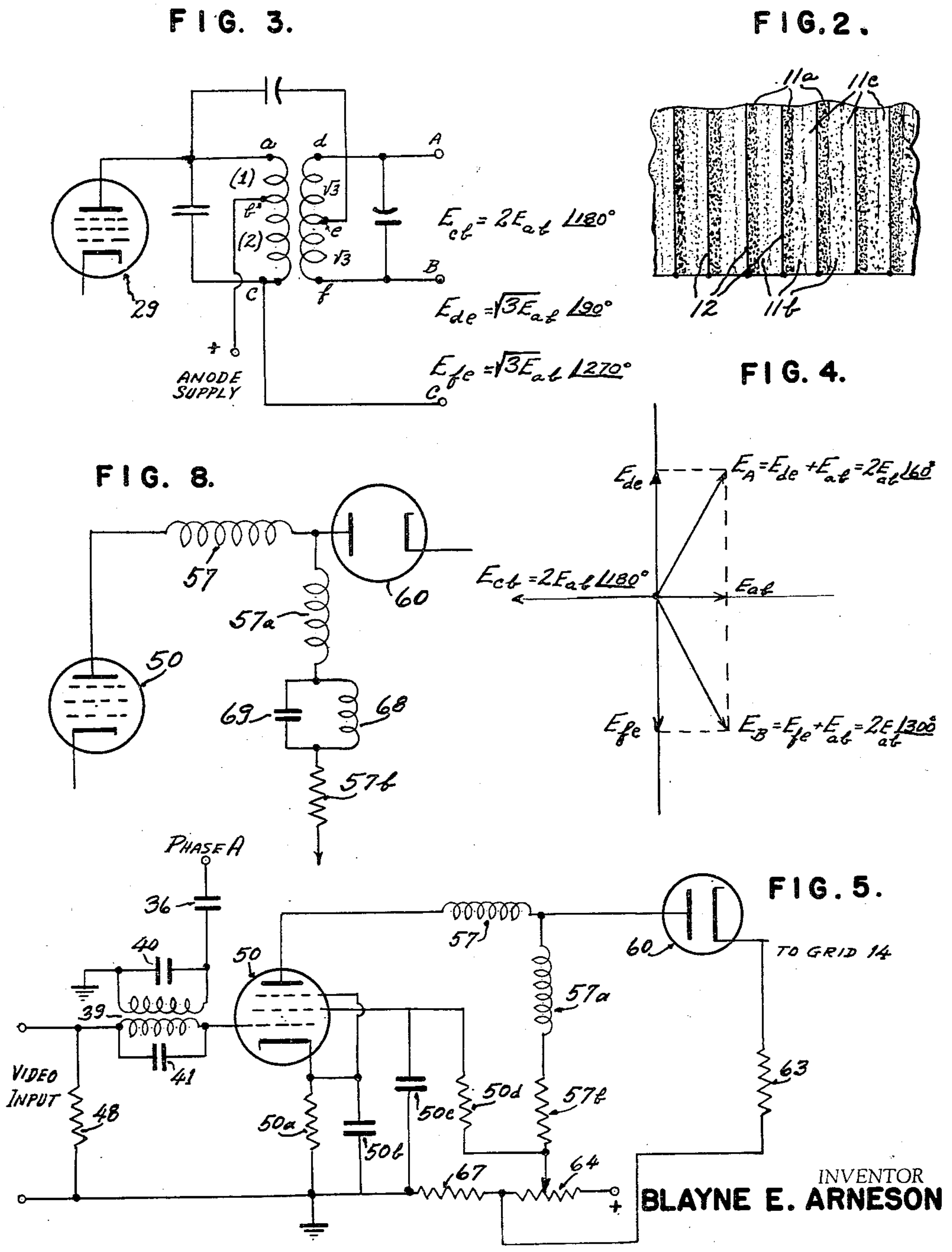
Fig. 2 is a fragmentary view of the viewing screen and grid electrode of the cathode ray tube employed in accordance with this invention.
Fig. 3 is a view of the phase splitting transformer employed in the amplifier and limiter circuit output.
Fig. 4 is a vector diagram showing the vectors of the voltages in the phase splitting transformer.
Fig. 5 is a detail view of the video amplifier circuit in which the video and R. F. signals are added in accordance with this invention.
Fig. 8 is a schematic diagram of a modified video amplifier circuit such as shown in Fig. 5.

The transformer 32 shown in detail in Fig. 3 is connected to the anode of the amplifier tube 29 and is constructed so as to develop three phase voltages from a single phase voltage supplied to the primary winding thereof from the anode of the amplifier tube 29. For this purpose one terminal of the primary winding of this transformer is connected to the anode of the tube 29 and the mid tap **32*b* of the secondary winding is coupled to this anode through the capacitor 33**.

The source of anode current supply for the tube 29 is connected to the tap **32*a* of the primary of the transformer 32. The screen grid electrode of the tube 29 is also connected to the positive terminal of the anode current supply and the resistor 29*a* is employed for this purpose. The capacitor 29*b* is connected between the screen grid electrode and the ground. Capacitors 34 and 35 are connected to the secondary and primary respectively, of the transformer 32 to tune these windings to the radio frequency keying signal produced by the cathode ray beam of the tube 10 in scanning the grid electrode 12. The capacitors 21, 22, 27, 28** previously mentioned, tune the transformers connected thereto to the same frequency.

The three phase voltages designated as phases A, B and C are taken off from the transformer 32 at points A, B and C, respectively. These points are connected through the capacitors 36, 37 and 38, respectively, to one of the terminals of each of the primaries of the transformers 39, 42 and 45, respectively. The other terminal of each of these primaries is grounded. Capacitors 40, 43 and 46 are connected across the primary windings and capacitors 41, 44 and 47 are connected across the secondary windings for tuning these windings to the radio frequency keying signal amplified by the tubes 23 and 29.

The secondaries of the transformers 39, 42 and 45 have one terminal connected to the control grids of the tubes 50, 53 and 56, respectively, and the other terminals thereof are connected to the sources of video signals 49, 52 and 55, respectively and to the resistors 48, 51 and 54, respectively. These sources supply the red, green and blue video signals to the inputs of the tubes 50, 53 and 56, respectively.

The outputs of the tubes 50, 53 and 56 are connected through high frequency compensation coils 57, 58 and 59, respectively, to the anodes of the diode couplers 60, 61 and 62, respectively, the cathodes of the latter being connected together to one terminal of the resistor 63 and to the control grid 14 of the cathode ray tube 10. The output circuits of each of the tubes 50, 53 and 56 are also provided with brightness control potentiometers 64, 65 and 66, respectively, and one terminal of each of these potentiometers resistance elements is connected to the anode current supply of these tubes. The other terminals of these potentiometers resistance elements are connected together to the common connection of the resistors 63 and 67. Additional high frequency compensation coils **57*a*, 58*a* and 59*a* are employed with one terminal thereof connected to the anode of the diodes 60, 61 and 62, respectively, and the other terminal thereof connected to the plate load resistors 57*b*, 58*b* and 59*b*, respectively, which in turn are connected to the variable contactors of the potentiometers 64, 65 and 66**, respectively.

Figure 1:
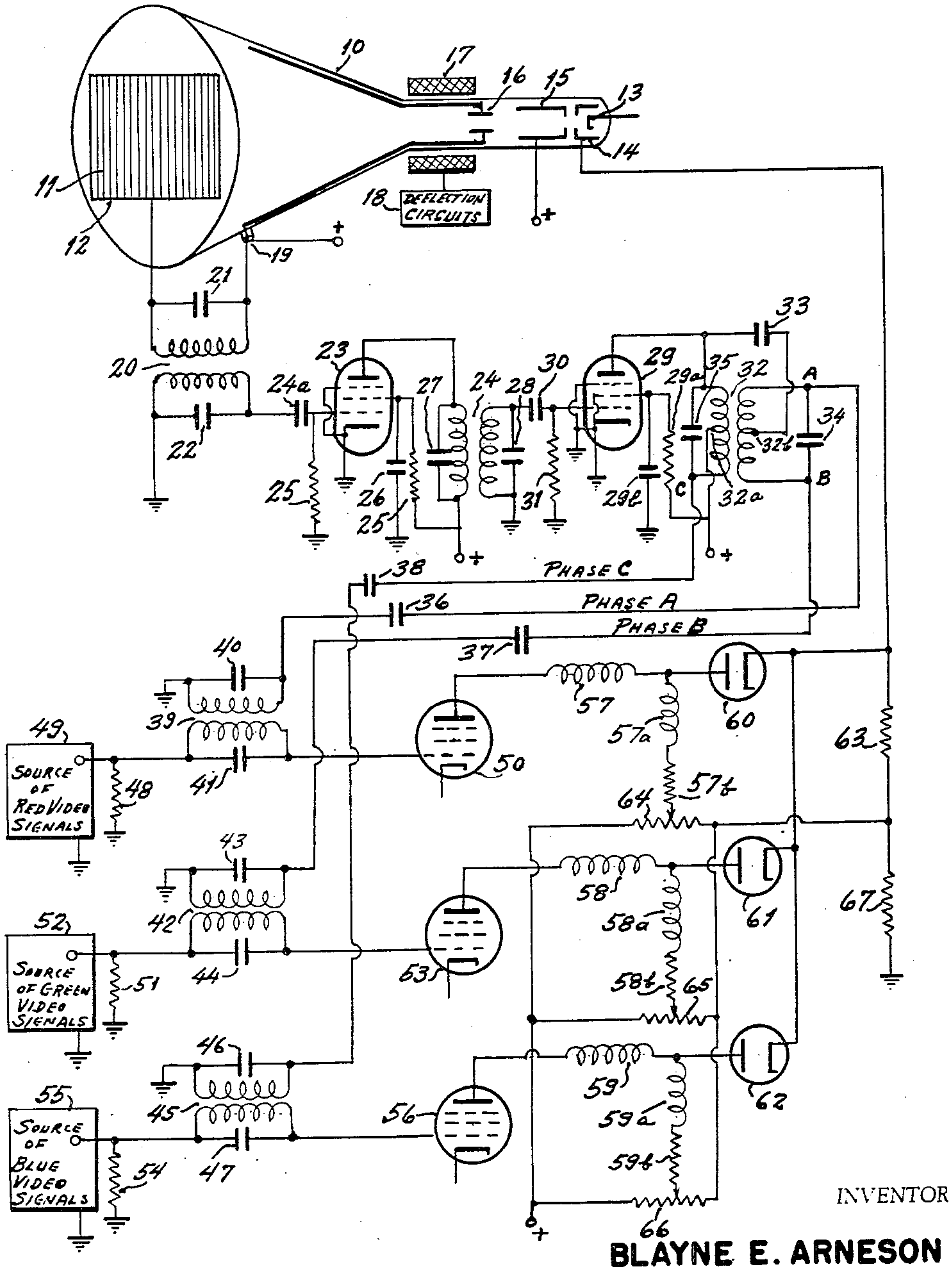
Fig. 1 is a schematic wiring diagram showing an embodiment of this invention.

Additional circuit elements are provided to each of the tubes 50, 53 and 56 and the complete schematic diagram of one of these tubes, for example, the tube 50 is shown in Fig. 5. The same reference numerals employed in Fig. 1 are also employed in Fig. 5 and in addition the connections between the cathode of the tube 50 and the cathode resistor **50*a* and cathode capacitor 50*b* are shown. The capacitor 50*c* is shown connected between the screen grid of the tube 50 and ground and the resistor 50*d* is illustrated connected between the screen grid and the variable contactor of the potentiometer 64**.

A modification of the circuits of the tubes 50, 53 and 56 is shown in Fig. 8 and in this figure the modification is applied to the circuit of tube 50 only although it may, of course, also be used in the circuits of the tubes 53 and 56. This modification consists of the addition of the tuned circuit comprising the inductance 68 and the capacitor 69 that is connected in series between the lower terminal of the high video frequency compensation coil **57*a* and the plate load resistor 57*b***. This tuned circuit is tuned to the frequency of the radio frequency signal and is used to increase the gain for this signal in each of the amplifier tube stages.

The face plate **10*a* which consists of the surface upon which are deposited the phosphors comprising the screen 11 to be scanned by the electron beam may be the inner surface of the cathode ray tube face or a separate, transparent plate, mounted just inside the face of the tube. This surface whether it is the inner surface of the cathode ray tube face or the surface of a separate plate facing the electron gun of the tube, is coated with a multiplicity of vertical phosphor strips, arranged in groups, with the same sequence of color producing phosphors in each group as shown in Fig. 2 which is an enlarged view of a portion thereof. For example, each group may be made up of a strip of red phosphor 11*a*, followed by a strip of green phosphor 11*b*, and then a strip of blue phosphor 11*c***. Reference to colors with respect to the various phosphors pertains to the color of the light which is produced when each is excited by the electron beam.

Separating each group of three phosphor strips **11*a*, 11*b* and 11*c* is a narrow conductive strip 12*a* comprising a very fine wire or a line or strip of conductive paint or other material deposited on the inner surface of the face plate 10*a*. These conductors 12*a* are joined at top and bottom to form the target grid electrode 12**.

During scanning of the cathode ray tube screen by the electron beam, the beam will pass rapidly across the phosphor strips, exciting the different color phosphors within each group in sequence. Between the phosphor color groups the electron beam will cross a conductor of the target grid electrode 12, thus pulses of current will flow in the circuit of this grid electrode at a frequency determined by the scanning rate and the number of color groups across the width of the tube face.

By connecting the grid electrode 12 to the second anode power supply through a parallel tuned circuit comprising the primary of the transformer 20 which is resonant to the repetition rate of the pulses, a sine wave of voltage is produced. The voltage wave will be in phase with the fundamental frequency component of the current pulses. This voltage wave is amplified and limited to constant magnitude in an appropriate tuned amplifier and limiter circuit comprising the tubes 23 and 29 and associated circuits described above.

Because minor frequency variations will occur due to slight non-linearity in the horizontal scanning rate, this amplifier should have a band width sufficient to minimize phase variations.

It is, of course, essential that in order to maintain a constant output voltage from the limiter, some residual beam current be present even when the beam intensity is reduced to the point where the phosphor is not caused to fluoresce so that current pulses are produced at the target grid electrode 12 at all times during the scanning of the beam. The total beam current therefor must not reduce to zero, even during totally black areas of the picture. This is a normal occurrence in the cathode ray tube however, visual extinction of the spot where the beam impinges the phosphor takes place at slightly greater than zero beam current.

The sine wave signal thus generated is at the proper frequency to provide keying information for application of the correct color video signal during the time that the beam is crossing a given color phosphor strip.

To develop individual keying signals for each of the color signals, the sine wave is next applied to a phase splitting circuit connected to the anode of the tube 29 for producing a balanced three phase output. Details of the phase splitting circuit that may be employed are shown in Fig. 3 and the vector relation of the voltages appearing across the windings of the transformer 32 are shown in Fig. 4, to illustrate the development of the three phase signal. The load circuit for the last limiter stage 29 is a double tuned transformer 32 as described above and the primary of this transformer is tapped at the point **32*a*** with the plate voltage supply applied at this tap.

The voltage at the lower terminal of the primary coil of the transformer 32 is 180° out of phase with the pulsating component of the plate voltage of the tube 29. Furthermore, the phase shift between primary and secondary voltages of a transformer having a tuned secondary is 90° at the resonant frequency and this principle is utilized in this invention to develop the other two required phases. The relative voltages present across the sections of the primary and secondary are indicated by the figures adjacent to each of the sections. The vector diagram Fig. 4 showing the addition of these voltages to produce the three phase output voltage is self explanatory.

By properly phasing and tuning the transformers in the amplifier-limiter circuit, the positive voltage peak of phase A may be caused to occur at the instant that the electron beam of the tube 10 is crossing the first phosphor strip of a color group, positive voltage peak of phase B during the second strip, and positive voltage peak of phase C during the third.

The next step in the keying of the color video signals is the combination of the three color video signals supplied by the sources 49, 52 and 55 with the three phase signals supplied to the inputs of the tubes 50, 53 and 56, respectively, through the tuned transformers 39, 42 and 45, respectively, so that color video information corresponding to each color phosphor strip is applied to the electron gun control grid 14 only while the electron beam is crossing the appropriate color phosphor strip.

Each of the three phases is added to a particular component of the color video signal. For example, if the color phosphor strip sequence is chosen as red, green, and blue, phase A is added to the red signal, phase B to the green, and phase C to the blue. This addition may be done at the grids of the corresponding video output tubes 50, 53 and 56 as shown in Fig. 1.

Figure 6:
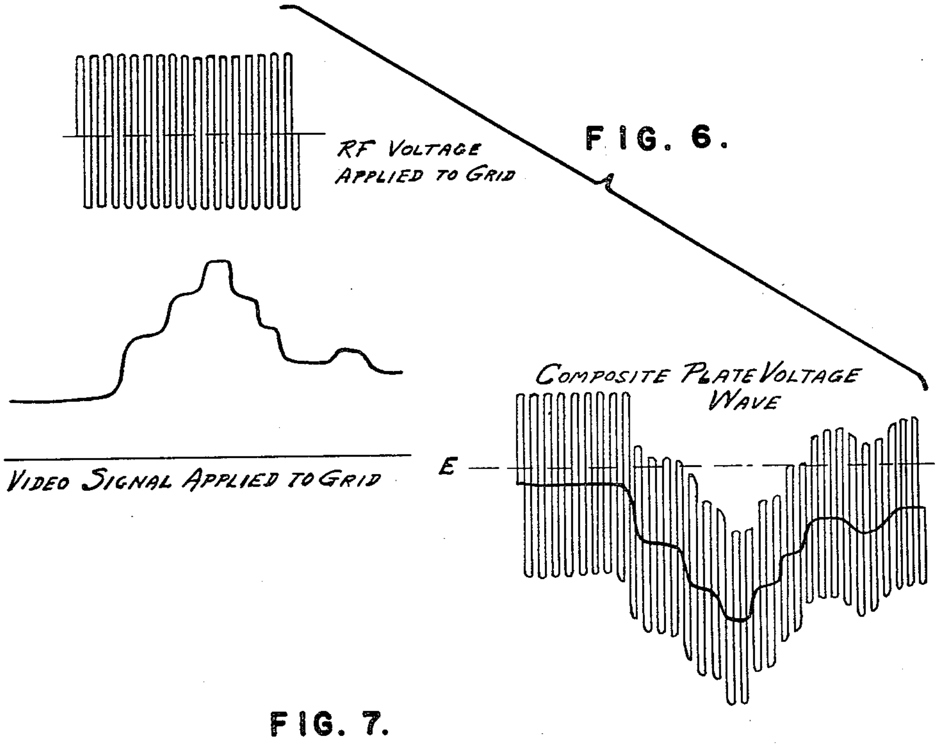
Fig. 6 is a diagram showing the wave forms of the R. F. and video signals before and after addition.
Figure 7:
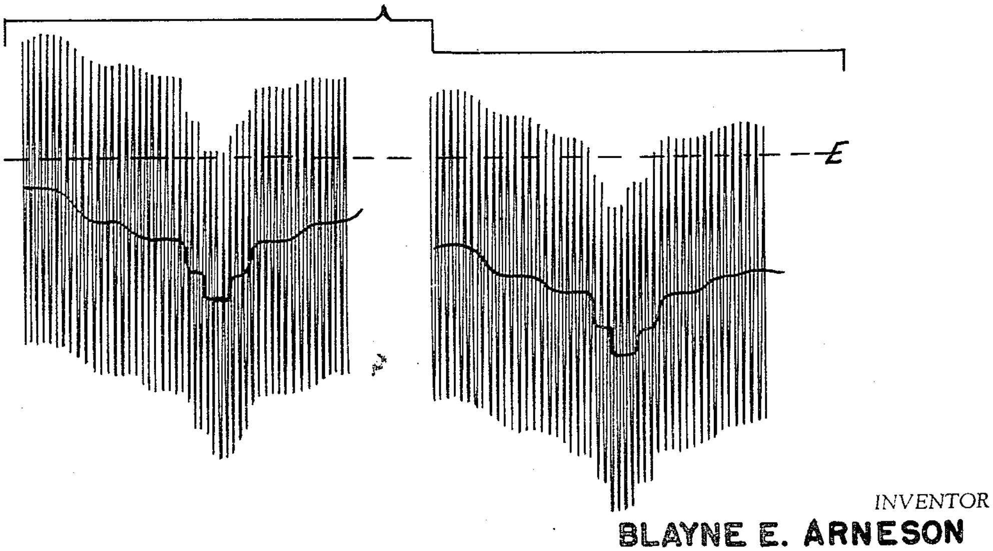
Fig. 7 is a view of the wave form of the composite video-R. F. signal with different plate voltages employed in the video amplifier.

The plate voltage wave of each of the video amplifier stages 50, 53 and 56 will contain the sum of the two grid voltages, namely, the R. F. voltage of phases A, B and C, respectively, and the video signals from the sources 49, 52 and 55, respectively, as shown in Fig. 6. A diode coupling circuit comprising the diodes 60, 61 and 62 is used to feed the outputs of the video amplifier stages to the control grid of the cathode ray tube and this coupling circuit is designed so that no voltage will appear across 63 unless the sum of the two voltages present at the respective diode plates exceed the respective diode bias voltage, as determined by the voltage drop across the resistor 67 and indicated as E in Fig. 6. If the magnitude of the R. F. component exceeds the peak to peak value of the video signal and the diode bias voltage is chosen so that at no time does the video component rise above the diode bias voltage, the resultant output will be a series of positive going pulses, the width of each being less than 180° of the R. F. cycle. Two wave forms are shown in Fig. 7 to illustrate the effect of varying the amplifier plate voltage upon the composite video-R. F. signal. As will be shown hereinafter, the width of each pulse produced in the diode output circuit should not exceed approximately 120° for maximum color saturation. The amplitude of the pulses will be maximum for maximum brightness.

All three video output stages 50, 53 and 56 are combined through separate diodes 60, 61 and 62 respectively, into a common load resistance 63 with the voltage across this load being applied directly to the cathode ray tube grid 14 as explained above. The minimum voltage which can occur at the cathode ray tube grid is the diode bias voltage which can be adjusted to ensure that a small beam current flows even during black areas of the picture. Individual brightness control for each color is obtained by adjusting the D. C. plate voltage of each video amplifier by means of the potentiometers 64, 65 and 66.

The contrast, or gain, for each video component is adjusted by varying the amplitude of each video signal prior to adding it to the R. F. signal in the amplifier grid circuit.

The combined signal being applied to the control grid of the cathode ray tube is therefore a series of pulses, the amplitude of each varying in accordance with a color video signal and occurring at the proper time to coincide with the scanning of a particular color phosphor strip.

If each pulse has a width of somewhat less than 120° of the R. F. cycle, the video signal applied during the scanning of a particular color phosphor strip will correspond only to the color of that strip. However, in the event that the pulses are wider than 120°, color from adjacent strips will be present in equal amounts which is undesirable and therefore it is important that the pulse width be kept below 120°.

Figure 9:
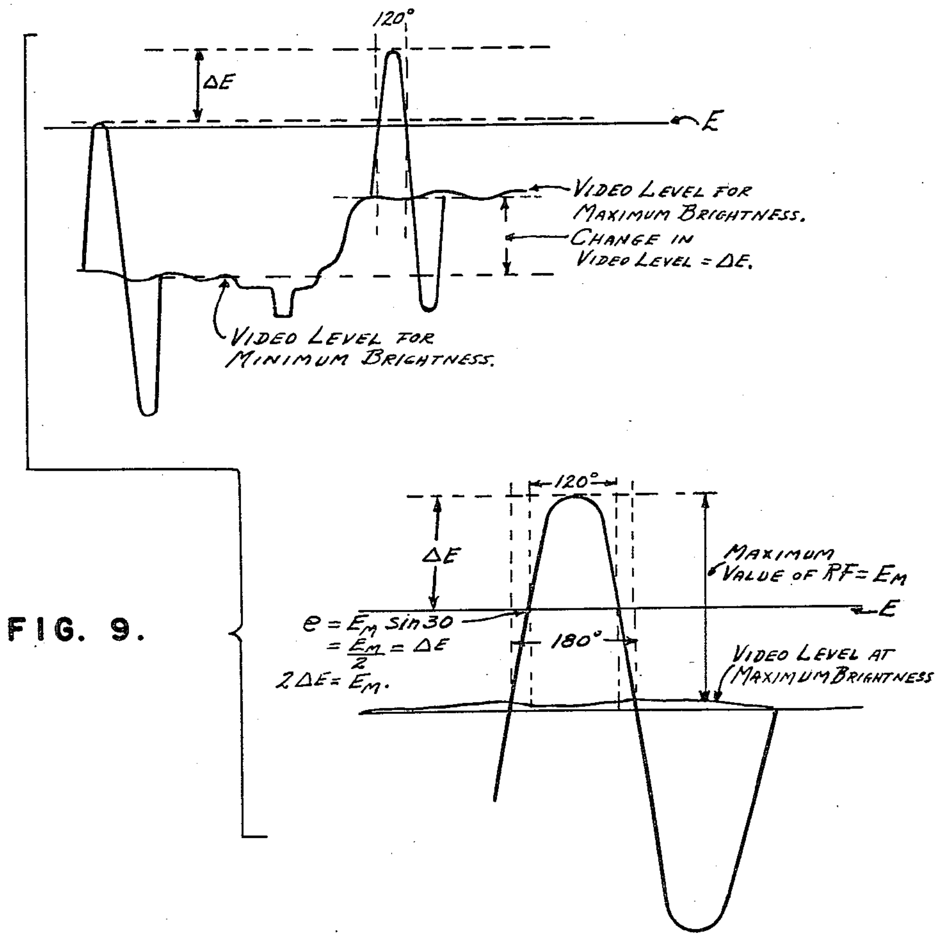
Fig. 9 is a view showing the relationship of the R. F.

The variation in magnitude of the portion of the R. F. voltage above the axis denoted as E in Fig. 6 is determined by the peak value of the video signal. In order that the R. F. signal component which extends above the level E may consist of pulses whose width is less than 120°, the magnitude of the R. F. signal at the output of the video amplifier must be at least twice the magnitude of the video variations, as will be readily apparent from the wave forms illustrated in Fig. 9.

To make the R. F. peak magnitude twice the video magnitude requires either the application of a large R. F. signal at the grid or the gain of the video amplifier must be much greater at the R. F. signal frequency. The latter condition may be obtained by inserting a resonant circuit 68, 69, shown in Fig. 8, tuned to the R. F. frequency as part of the load of the video amplifier.

The frequency of the three phase signal required depends upon the number of vertical phosphor groups used and it will vary directly with the horizontal definition desired in the picture produced on the screen of the cathode ray tube 10. To yield a degree of definition comparable to that attainable in present black and white receivers would require approximately 450 phosphor groups, resulting in a three phase signal frequency of approximately 8.0 megacycles. The coupling circuit between the combined video amplifier outputs and the cathode ray tube grid must be capable of passing at least the second harmonic of this frequency because of the pulse characteristics of the output wave applied to the cathode ray tube control grid.

During reception of a program in black and white all three video amplifiers 50, 53 and 56 are to be driven by a portion of the black and white video signal such that the three colors will add to produce various shades of gray, ranging from black to white on the screen of the conventional cathode ray tube employed for black and white pictures.

An alternate method of producing the sine wave signal is illustrated in Fig. 10 wherein the radio frequency pulses from the target grid electrode 12 of the cathode ray tube 10 are fed to the phase detector 70 which is connected to the reactance tube 71 to lock in the radio frequency oscillator 72 and cause this oscillator to generate oscillations of the same frequency as the radio frequency pulses produced by the scanning of the target grid electrode by the cathode ray beam. For this purpose a portion of the oscillator output is fed to the phase detector 70 and the other portion of the oscillator output is fed to the phase splitting circuit 73 which may consist of a transformer similar to that previously described. The three phase voltages from the phase splitting circuit 73 are supplied to the inputs of the three clipper and modulator circuits 74, 75 and 76 respectively, and the red, green and blue video signals are also supplied to the inputs of these circuits 74, 75 and 76 respectively. The outputs of these three circuits are connected together to the control grid of the cathode ray tube in the same manner and for the same purpose as the outputs of the three diodes previously described.

While I have described this invention in detail with respect to certain embodiments thereof, it is, of course, not desired to limit the invention to the exact details shown and described except in so far as these may be defined by the claims.

What I claim is:

1. Cathode ray tube apparatus for reproducing television signals in color comprising a cathode ray tube having an electron gun, a screen and a target grid electrode comprising a plurality of grid conductors connected together, said screen comprising phosphor strips adapted to fluoresce in the three primary colors and arranged side by side to form a plurality of three color phosphor strip groups, each of said groups being positioned between conductors of said target grid electrode, means for deflecting the beam of said cathode ray tube across said phosphor groups and said conductors for producing a voltage pulse each time said beam intercepts one of said conductors, a transformer having a primary connected between said target grid electrode and an anode of said cathode ray tube, a phase splitting circuit connected to the secondary of said transformer for developing three phase voltage pulses from each of the voltage pulses produced by said beam impinging said target grid electrode, means for adding said three phase voltage pulses individually to a different color video signal in a predetermined sequence corresponding to the color sequence of said phosphors in said groups so that each color video signal is added to a predetermined one of said voltage phases, and means for controlling said beam in accordance with said added voltages so that different color phosphors of each of said groups may be caused to fluoresce in accordance with the corresponding color video signal.

2. Cathode ray tube apparatus for reproducing television signals in color comprising a cathode ray tube having an electron gun, a screen and a target grid electrode, said screen comprising phosphor strips adapted to fluoresce in the three primary colors and arranged side by side to form a plurality of three color phosphor strip groups, each of said groups being positioned between conductors of said target grid electrode, means for deflecting the beam of said cathode ray tube across said phosphor groups and said conductors for producing a voltage pulse each time said beam intercepts one of said conductors, means comprising an amplifier having coupling transformers tuned to the repetition frequency of said pulses for producing a substantially sinusoidal wave corresponding thereto, a phase splitting circuit for developing three phase voltage waves from said substantially sinusoidal wave, means for adding said three phase voltage waves individually to a different color video signal in a predetermined sequence corresponding to the color sequence of said phosphors in said groups so that each color video signal is added to a predetermined one of said voltage phases, means for rectifying said added voltage waves and for producing pulses each of which have a width that does not exceed 120 degrees of the cycle of said substantially sinusoidal wave, and means for controlling said beam in accordance with the voltage pulses produced by said last mentioned means so that different color phosphors of each of said groups may be caused to fluoresce in accordance with the corresponding color video signal.

3. Cathode ray tube apparatus for reproducing television signals in color comprising a cathode ray tube having an electron gun, a screen and a target grid electrode, said screen comprising phosphor strips adapted to fluoresce in the three primary colors and arranged side by side to form a plurality of three color phosphor strip groups, each of said groups being positioned between conductors of said target grid electrode, means for deflecting the beam of said cathode ray tube across said phosphor groups and said conductors for producing a voltage pulse each time said beam intercepts one of said conductors, means for producing a substantially sinusoidal voltage wave corresponding to the voltage pulses produced by said beam intercepting said conductors of said target grid electrode, a phase splitting circuit connected to said last mentioned means for developing three phase voltage waves from said substantially sinusoidal wave so that the maxima of different ones of said three phase voltage waves correspond in time relation to the scanning by said beam of different ones of the respective three color phosphor strips, means for adding said three phase voltage waves individually to a different color video signal in the same sequence as the same color phosphor strip is scanned, means connected to said last mentioned means for rectifying said added voltage waves and for producing pulses each of which have a width that does not exceed 120 degrees of the cycle of said substantially sinusoidal wave, and means for controlling said beam in accordance with the voltage pulses produced by said last mentioned means so that different color phosphors of each of said groups may be caused to fluoresce in accordance with the corresponding color video signal.

4. Cathode ray tube apparatus for reproducing television signals in color as set forth in claim 3 further characterized in that the means for producing a substantially sinusoidal voltage comprises a transformer having the primary connected between said target grid electrode and the high voltage anode of said cathode ray tube, the primary and secondary of said transformer being tuned to the repetition rate of the voltage pulses produced by the beam intercepting said target grid electrode conductors.

5. Cathode ray tube apparatus for reproducing television signals as set forth in claim 3 further characterized in that the means for adding the three phase voltage waves individually to different color video signals comprises transformers each having means for tuning the windings thereof to the repetition rate of the pulses produced by the beam of said cathode ray tube intercepting the conductors of said target grid electrode.

6. Cathode ray tube apparatus for reproducing television signals as set forth in claim 5 further comprising an amplifier tube connected to each of said transformers for amplifying the added signals, means connected to the output of each amplifier tube to increase the magnitude of the radio frequency voltage supplied by said phase splitting circuit to make said radio frequency voltage magnitude substantially greater than the video signal added thereto, said last mentioned means being connected to said rectifying means.

7. Cathode ray tube apparatus for reproducing television signals as set forth in claim 6 further characterized in that said rectifying means includes diode rectifiers, said rectifiers having the anodes thereof individually connected to the anodes of said amplifiers whereby the different color video signals and the different phases of said radio frequency voltages are rectified separately, and means for connecting the cathodes of said diode rectifiers together to supply signals to the means for controlling the cathode ray tube beam.

8. Cathode ray tube apparatus for reproducing television signals as set forth in claim 7 further characterized in that anode potential is applied to the anodes of the amplifier tubes and diode rectifiers through separate potentiometers whereby the intensity of the different color signal components of the video signal may be individually controlled.

9. Cathode ray tube apparatus for reproducing television signals in color comprising a cathode ray tube having a target grid electrode comprising a pluarlity of grid like conductors, a screen made up of a plurality of groups of vertical strips of phosphors, each of said groups having strips of phosphors adapted to fluoresce red, green and blue, one of said groups being positioned between adjacent conductors of said target grid electrode, said tube having means for producing a cathode ray beam, means for sweeping said beam horizontally across said screen, means connected to said target grid electrode for producing a radio frequency three phase signal having a frequency equal to the product of the number of said groups and the horizontal sweeping frequency of the beam of said tube, separate sources of red, green and blue video signals, means for adding said red, green and blue video signals separately to the phases of said three phase signal, individual color signal intensity control connected to said last mentioned means for controlling the intensity of the color components of the video signal, means for producing unidirectional pulses from said added signals, and means for controlling the beam of said tube in accordance with said unidirectional pulses so that said red, green and blue video signal components thereof control the intensity of said beam as said beam impinges said strips adapted to fluoresce red, green and blue respectively.

10. Cathode ray tube apparatus for reproducing television signals in color comprising a cathode ray tube having a target grid electrode comprising a plurality of grid like conductors, a screen made up of a plurality of groups of vertical strips of phosphors, each of said groups having strips of phosphors adapted to fluoresce red, green and blue, one of said groups being positioned between adjacent conductors of said target grid electrode, said tube having means for producing a cathode ray beam, means for sweeping said beam horizontally across said screen, means connected to said target grid electrode for producing a radio frequency three phase signal having a frequency equal to the product of the number of said groups and the horizontal sweeping frequency of the beam of said tube, separate sources of red, green and blue video signals, means for adding said red, green and blue video signals separately to the phases of said three phase signal, individual color signal intensity control connected to said last mentioned means for controlling the intensity of the color components of the video signal, said individual intensity control each comprising a manually adjustable potentiometer connected to control the anode potentials of the respective amplifier tubes, means for producing unidirectional pulses from said added signals, and means for controlling the beam of said tube in accordance with said unidirectional pulses so that said red, green and blue video signal components thereof control the intensity of said beam as said beam impinges said strips adapted to fluoresce red, green and blue respectively.

References Cited in the file of this patent

UNITED STATES PATENTS

| | | |
|---|---|---|
| 2,667,534 | Creamer | Jan. 26, 1954 |
| 2,674,651 | Creamer | Apr. 6, 1954 |
| 2,689,269 | Bradley | Sept. 14, 1954 |